April 28, 1942.  R. A. GEISELMAN  2,281,034
REGULATING SYSTEM
Filed July 27, 1940

WITNESSES:  
INVENTOR  
Ralph A. Geiselman.  
BY  
ATTORNEY

Patented Apr. 28, 1942

2,281,034

UNITED STATES PATENT OFFICE 2,281,034

REGULATING SYSTEM

Ralph A. Geiselman, Wilkinsburg, Pa., assignor to Westinghouse Electric & Manufacturing Company, East Pittsburgh, Pa., a corporation of Pennsylvania Application July 27, 1940, Serial No. 347,900

4 Claims. (Cl. 171—119)

This invention relates to regulating systems.

In industry and particularly those industries utilizing arc furnaces, it is desirable to provide for sensitive control of the generating equipment which supplies the power whereby a change in the voltage generated is effected as soon as possible after a change in the load occurs. Regulating apparatus responsive to a change of voltage caused by a change in the load applied to a particular system are well known. Such regulating apparatus, however, have the disadvantage that sufficient time must elapse for the voltage to change a predetermined amount before the operation of the regulating apparatus is initiated. The time delay thus encountered before initiation of the operation of the regulating apparatus is undesirable.

An object of this invention is to provide a regulating system responsive to changes in both current and voltage for initiating a regulating action.

Another object of this invention is to provide a regulating system for a generator which supplies power to a load which may fluctuate which is so sensitive to changes in current as to initiate a regulating action to control the voltage generated prior to the initiation of the regulating action by a change in the voltage only when the load applied to the system is changed.

Figure 1:
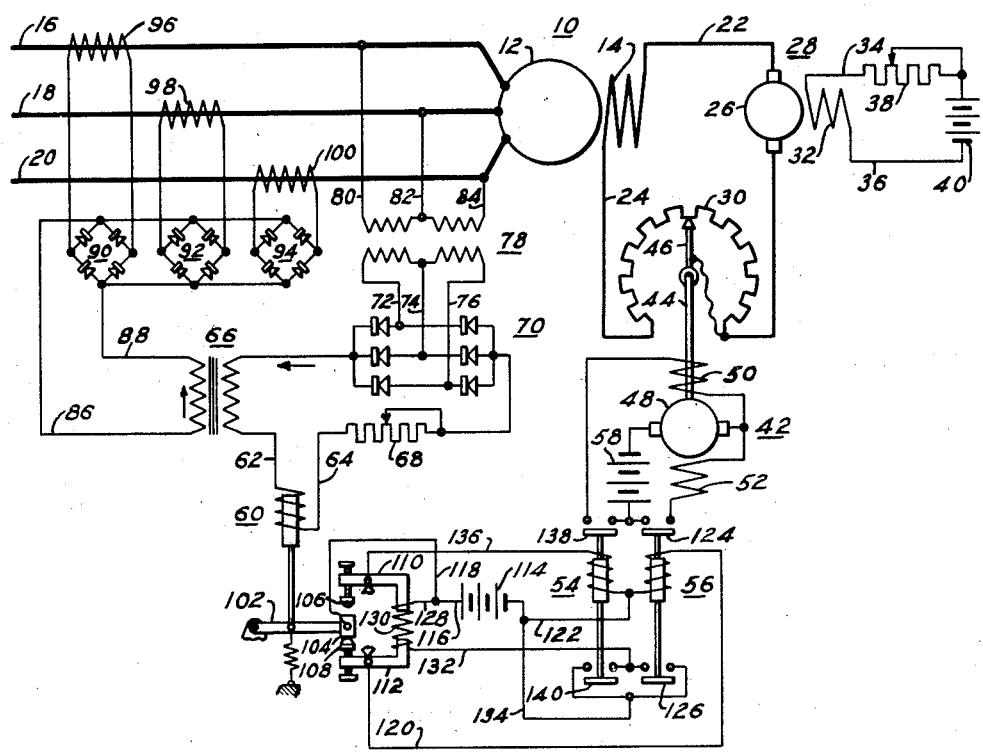
Figure 2:
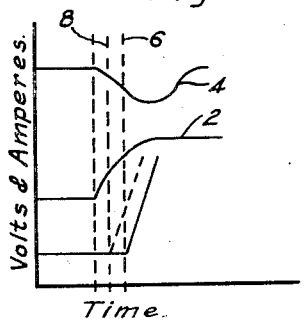

Other objects of this invention will become apparent from the following description when taken in conjunction with the accompanying drawing, in which:

Figure 1 is a diagrammatic view of circuits and apparatus embodying the teachings of this invention, and Fig. 2 is a representative graph, the curves of which illustrate the comparative changes in current and voltage encountered in a system which supplies a changing load and the relative time for initiating the regulating action when a change of load is applied to a power system.

Referring now to the drawing, the regulating system shown is provided for maintaining the voltage of the generator 10 substantially constant. The generator 10 is provided with an armature winding 12 and a field winding 14. As illustrated, the armature is connected across a three-phase transmission line comprising conductors 16, 18 and 20 for delivering power to an arc furnace (not shown).

The field winding 14 is connected by conductors 22 and 24 to the armature winding 26 of a pilot generator 28 through a motor operated field rheostat 30 which is connected in series circuit relation with the field winding 14. The pilot generator 28 is also provided with a field winding 32 which is connected by conductors 34 and 36 through a variable resistor 38 to a suitable source of direct current such as the battery 40.

A pilot motor 42 is provided for operating the field rheostat 30 and is connected thereto by means of the drive 44 for actuating the contact arm 46 which electrically engages the resistor element. The pilot or rheostat motor 42 is provided with an armature winding 48 and field windings 50 and 52. Relays 54 and 56 are connected in circuit relation with the field windings 50 and 52 to control the operation of the motor 42 from a battery 58 as will be explained more fully hereinafter.

Since it is desired to control the operation of relays 54 and 56 in accordance with predetermined changes in current and voltage occasioned by changes in load applied to the transmission lines 16, 18 and 20, a primary relay 60 is provided having its operating winding connected to be energized in accordance with the predetermined changes in current and voltage. In the embodiment illustrated, the operating winding of relay 60 is so connected to the transmission line as to be responsive to the rate of change of current supplied to the load as well as the voltage generated by the generator 10. The operating winding of relay 60 is connected by conductors 62 and 64 through the secondary winding of a rate of change or surge transformer 66 and a variable resistor 68 respectively, to a three-phase rectifier translating device 70 which is utilized for changing the alternating current voltage of the generator 10 to a direct current voltage. The rectifier 70 is connected by conductors 72, 74 and 76 to the secondary winding of a transformer 78, the primary winding of which is connected by conductors 80, 82 and 84 to the power supply line conductors 16, 18 and 20, respectively.

In order that the operating winding of relay 60 be responsive to the rate of change of current supplied to the load, the primary winding of the transformer 66 is connected by conductors 86 and 88 through three rectifying units 90, 92 and 94 to the current transformers 96, 98 and 100 inductively associated with the transmission line conductors 16, 18 and 20, respectively. As illustrated, the primary winding of the rate of change transformer is so connected to the line conductors 16, 18 and 20 that upon a change in current supplied to the load, the current flowing through the primary winding of the transformer 66 induces a voltage in the secondary winding which opposes the voltage which is imposed in the operating winding circuit of relay 60 by the generator voltage. Thus if the change in current supplied to the load is an increase, the combined effect of the two opposed voltages on the operating winding of relay 60 is decreased whereas a decrease in the current supplied to the load effects an increase in the component voltage across the operating winding of relay 60. Thus the voltage across the operating winding of relay 60 is a component voltage which varies inversely as the current supplied to the load.

The energization of the operating winding of relay 60 changes with a change in the load and will either raise or lower a contact carrying arm 102 having contact members 104 thereon to engage a cooperating contact member 106 or 108 carried by a movable arm 110 or 112, respectively, for initiating a circuit to control the actuation of secondary relays 54 and 56 which, in turn, control the operation of the field rheostat 30.

If the energization of the operating winding of relay 60 decreases, the arm 102 swings downwardly and the contact member 104 engages contact member 108 closing a circuit which may be traced from a battery 114, through conductors 116 and 118, contact members 104 and 108, conductor 120, the actuating coil of relay 56 and conductor 122 back to the battery 114. The contact member 124 of relay 56 is thus actuated to close the circuit to energize field winding 52 of the motor 42 and cause the motor to operate to shunt more of the field rheostat 30 from circuit with the generator field winding to increase its energization thereby effecting an increase in the voltage generated. At the same time, contact member 126 of relay 56 is actuated to close a circuit which extends from the battery 114, through conductors 116 and 128, actuating winding 130 for the movable members 110 and 112, conductor 132, contact member 126 through conductor 134, back to the battery 114. The winding 130 is thus energized to actuate the movable arms 110 and 112 to tend to separate the contact member 104 from the contact member 108.

The construction of the apparatus comprising the movable arms 110 and 112, the winding 130 and the functioning to separate the contact members 104 and 108 to prevent hunting is disclosed in Patent No. 2,121,601, issued June 21, 1938, to J. F. Kovalsky. With this structure if the change in the energization of the operating winding of relay 60 is small, the energization of winding 130 will effect the separation of the contact members 104 and 108 to deenergize the relay 56, and prevent further operation of the motor 42. If the decrease in the energization of the operating winding of relay 60 is, however, of large value, then the contact carrying arm is dropped to its lowermost position so that regardless of the movement of the arm 112 in response to the energization of winding 130, the contact members 104 and 108 stand engaged to maintain the energization of relay 56 and effect the operation of the rheostat motor 42.

If the load on the transmission line conductors 16, 18 and 20 changes so as to effect an increase in the energization of the operating winding of relay 60, the contact carrying arm 102 is actuated upwardly to effect an engagement of contact member 104 with the contact member 106 on the movable arm 110 to close a circuit which extends from the battery 114, through conductors 116 and 118, contact members 104 and 106, conductor 136, actuating coil of relay 54 and conductor 122, back to the battery 114. With the actuating coil of relay 54 thus energized, contact member 138 of relay 54 closes a circuit to energize field winding 50 of the rheostat motor 42 to cause it to operate to add more of the rheostat 30 in series circuit with the generator field winding 14 and effect a reduction in the voltage generated by the generator 10. At the same time, contact member 140 of relay 54 is actuated to close a circuit extending from the battery 114, through conductors 116 and 128, actuating winding 130, conductor 132, contact member 140 and conductor 134, back to the battery 114 to provide antihunting in the same manner as described hereinbefore with respect to the winding 130 to tend to separate the contact members 104 and 106.

In operation, assuming that the generator 10 is so energized as to deliver power to a load such as an arc furnace, and assuming that the load is substantially constant so that the energization of the operating winding of primary relay 60 is of such a value as to position the contact carrying arm 102 midway between the contacts 106 and 108, if the load is then increased, the current drawn by the load will increase sharply while the voltage across the line decreases.

Referring to Fig. 2 of the drawing, there are representative curves illustrating the change in current, as represented by curve 2, and of voltage, as represented by curve 4, when the load is increased. As illustrated, the change in current is quite sharp with respect to the change in voltage. This phenomena is encountered where the load supplied is an arc furnace.

With an increase in the load, the current traversing the primary winding of the rate of change transformer 66 is greatly increased so as to impress a voltage on the secondary winding of the transformer 66 which opposes the representative voltage of the line conductors 16, 18 and 20. The resulting component voltage across the secondary winding of the transformer 66 causes a current to flow through the operating winding of relay 60 which is of less value and effects a decrease in the energization of the relay winding. If the voltage induced by the current flowing in the primary winding of damping transformer 66 were not impressed across the secondary of the transformer to oppose the voltage of the transmission line, the change in the energization of the operating winding of the primary relay 60 due to the change in the voltage of the line only would not be effective for operating the movable contact carrying arm 102 to initiate the circuit to effect the operation of the rheostat motor 42 until the voltage of the line had dropped to a value illustrated by vertical line 6 in Fig. 2. However, with the change in current supplied to the load effecting a change in the voltage across the secondary winding of transformer 66, the change in the energization of the operating winding of primary relay 60 is effected substantially simultaneously with the change in load, as indicated by vertical line 8 of Fig. 2, so that the initiating effect of any change in current supplied to the load for actuating the relay 60 is prior to the initiating effect due to a change in the voltage of the generator or line only.

If the component voltage across the operating winding of relay 60 is decreased from the component voltage under normal loads, the contact carrying arm 102 drops to its lower position where contact member 104 engages contact member 108 to close the circuit to energize the operating winding of secondary relay 56 to so actuate it upwardly that its contact member 124 closes the circuit to energize the field winding 52 of the rheostat motor 42 to effect its operation and actuate the contact arm 46 to shunt more of the rheostat 30 from the circuit with the field winding 14 of the generator 10 and thereby effect an increase in the voltage generated by the generator.

Conversely, if the load on the transmission line is so changed as to effect a reduction in the current supplied to the load and an increase in the voltage across the line, the current flowing in the primary winding of transformer 66 induces a smaller voltage in the secondary winding of the transformer, thereby reducing the opposition to the line voltage and, in effect, giving a larger component voltage across the operating winding of relay 60. The increase in the component voltage across the operating winding of relay 60 actuates the movable arm 102 to its upward position where contact member 104 engages contact member 106 to close the circuit for energizing the operating winding of secondary relay 54 to actuate its contact member 138 to close the energizing circuit of the field winding 50 of the rheostat motor 42 and cause it to operate to move the arm 46 to introduce more of the rheostat 30 in series with the field winding 14 of the generator 10 and thereby effect a reduction in the voltage generated by the generator.

By utilizing the regulating system of this invention, it is quite apparent that the initiation of the regulating action is effected substantially instantaneously with a change in the load, the initiation of the regulating action due to the change in both current and voltage being prior to the operation of the regulating device in response to a change in the generator voltage only. Thus by utilizing a component voltage which depends upon both a change in the current and voltage, a very sensitive control of the voltage generated can be obtained to maintain substantially constant voltage.

Although this invention has been described with reference to a particular embodiment thereof, it is, of course, not to be limited thereto except insofar as is necessitated by the prior art and the scope of the appended claims.

I claim as my invention:

1. In a regulating system, in combination, a generator provided with a field winding for delivering three-phase power to a load which may fluctuate, a rheostat connected in circuit relation with the field winding to control the field excitation, a motor for operating the rheostat, and a direct-current relay for initiating and controlling the operation of the rheostat motor to effect an increase or decrease in the field excitation, the relay being responsive to a direct current component voltage which is inversely dependent upon a change in current supplied to the load and directly dependent upon a change in the generator voltage.

2. In a regulating system, in combination, a generator having a field winding and an armature winding, a polyphase transmission line connected in circuit relation to the generator for delivering power to a load which may fluctuate, a rheostat connected in circuit relation with the field winding to control the field excitation, a motor for operating the rheostat, a direct-current voltage responsive means disposed to control the operation of the rheostat motor, a circuit for applying a direct-current voltage which is proportional to the generator voltage to the direct-current voltage responsive means, and a circuit electrically connected to the transmission lines and inductively connected to the voltage circuit for applying to the voltage responsive means a direct-current component voltage which varies inversely as the load current for initiating the operation of the rheostat motor to effect an increase or decrease in the field excitation prior to the operation of the voltage responsive means in response to only a change in the generator voltage.

3. In a regulating system, in combination, a generator having a field winding and an armature winding, a polyphase transmission line connected in circuit relation to the generator for delivering power to a load which may fluctuate, a rheostat connected in circuit relation with the field winding to control the field excitation, a motor for operating the rheostat, a voltage responsive means disposed to control the operation of the rheostat motor, a circuit including rectifying means for applying a voltage which is proportional to the generator voltage to the voltage responsive means, and a circuit including rectifying means electrically connected to the transmission lines and inductively coupled to the voltage circuit for applying to the voltage responsive means a component voltage which varies inversely as the load current for initiating the operation of the rheostat motor to effect an increase or decrease in the field excitation prior to the operation of the voltage responsive means in response to only a change in the generator voltage.

4. In a regulating system, in combination, a generator having a field winding and an armature winding, a polyphase transmission line connected in circuit relation to the generator for delivering power to a load which may fluctuate, a rheostat connected in circuit relation with the field winding to control the field excitation, a motor for operating the rheostat, a voltage responsive means disposed to control the operation of the rheostat motor, a circuit including rectifying means for applying a voltage which is proportional to the generator voltage to the voltage responsive means, a circuit including a current transformer and rectifying means electrically connected to each phase of the polyphase transmission lines whereby the current in the circuit is a measure of the load current, and an inductive coupling connected in circuit relation with the voltage circuit and the current circuit for inducing a voltage in the voltage circuit upon a change in current to oppose the voltage which is proportional to the generator voltage whereby the component voltage delivered to the voltage responsive means is a measure of the rate of change of load and initiates the operation of the rheostat motor to effect an increase or decrease in the field excitation prior to the operation of the voltage responsive means in response to only a change in the generator voltage.

RALPH A. GEISELMAN.